US012571477B2

(12) United States Patent
Kato et al.

(10) Patent No.: US 12,571,477 B2
(45) Date of Patent: Mar. 10, 2026

(54) MIXING VALVE

(71) Applicant: MIKUNI CORPORATION, Tokyo (JP)

(72) Inventors: Hiroshi Kato, Odawara (JP); Hideaki Kashiwagura, Odawara (JP); Satoshi Ando, Odawara (JP); Yuko Kikuchi, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 2 days.

(21) Appl. No.: 18/760,102

(22) Filed: Jul. 1, 2024

(65) Prior Publication Data

US 2025/0012367 A1     Jan. 9, 2025

(30) Foreign Application Priority Data

Jul. 7, 2023     (JP) .................................. 2023-111954

(51) Int. Cl.
F16K 11/085          (2006.01)
(52) U.S. Cl.
CPC ....... F16K 11/0856 (2013.01); *F16K 11/0853* (2013.01)
(58) Field of Classification Search
CPC .......................... F16K 11/0853; F16K 11/0856
See application file for complete search history.

(56) References Cited

U.S. PATENT DOCUMENTS 6,196,266 B1 *   3/2001   Breda ................. F16K 11/0853
                                                              137/454.6
9,228,664 B2 *   1/2016   Partridge ............... F16K 5/184
10,883,619 B2 *  1/2021   Smith ................... F16K 27/065

FOREIGN PATENT DOCUMENTS

JP          2010-001925          1/2010

* cited by examiner

*Primary Examiner* — Michael R Reid
(74) *Attorney, Agent, or Firm* — STAAS & HALSEY LLP

(57)          ABSTRACT

A mixing valve 1 includes: a housing 2 with a valve chamber 6 formed therein; and a rotor 4 rotatably inserted into the valve chamber 6, the housing 2 includes, in a first peripheral wall 12, a first inlet port 14 opening at a first opening 20 to the valve chamber 6 and a second inlet port 16 opening at a second opening 22 to the valve chamber 6, a first fluid F1 flowing into the first inlet port 14, a second fluid F2 flowing into the second inlet port 16, the rotor 4 includes, in a second peripheral wall 28, a first inflow pipe 30 and a second inflow pipe 32, and a housing 2 includes, in the first peripheral wall 12, a discharge port 18 discharging the first fluid F1 and/or the second fluid F2 flowing into the valve chamber 6 without passing through the first inflow pipe 30 and/or the second inflow pipe 32 of the rotor 4, respectively, as a discharge fluid DF to the outside of the housing 2, and includes an outlet port 26 communicating with a mixing flow path 24.

6 Claims, 7 Drawing Sheets

MIXING VALVE

CROSS-REFERENCE TO RELATED APPLICATIONS

This application is based on and hereby claims right of priority benefit under 35 USC 119 to Japanese Application No. 2023-111954, filed Jul. 7, 2023, in the Japan Patent Office, the entire contents of which are incorporated herein by reference.

BACKGROUND OF THE INVENTION

Field of the Invention

The present invention relates to a mixing valve and particularly to a mixing valve capable of mixing different fluids at a predetermined flow amount ratio and thereby obtaining a desired mixed fluid.

Description of the Related Art

Japanese Patent Laid-Open No. 2010-1925 discloses a flow regulating valve capable of adjusting a ratio at which water and hot water are mixed and thereby obtaining warm water at a desired temperature. The flow regulating valve is for use in a hot-water supply and the like and includes a valve main body including a cylindrical valve chamber and a valve body rotatably inserted into the valve chamber. The valve main body includes two side ports into which water and hot water flow, respectively. Each side port is opened into the valve chamber, and a ratio at which water and hot water are mixed is adjusted by an opening area of each side port changing with rotation of the valve body.

If the opening area of each side port, in other words, each inlet port decreases with rotation of the valve body, a flow of the fluid on the upstream side of each inlet port stagnates. For example, consider the case where there is a heat exchanger to adjust a temperature of a fluid on the upstream side of the flow regulating valve, in other words, the mixing valve. In this case, the flow of the fluid on the upstream side of the mixing valve may stagnate due to the narrowing of the flow path at the mixing valve and heat exchange efficiency of the fluid in the heat exchanger may be degraded. Therefore, there has been a need for a mixing valve that does not hinder the flow of the fluid on the upstream side and can thus minimize influences on devices disposed on the upstream side.

An object of the present invention, which has been made in view of such problems, is to provide a mixing valve capable of minimizing influences on devices disposed on an upstream side by not hindering a flow of a fluid on the upstream side.

SUMMARY OF THE INVENTION

In order to achieve the above object, a mixing valve according to the present invention includes: a cylindrical housing with a valve chamber formed therein; and a rotor rotatably inserted into the valve chamber, in which the housing includes, in a first peripheral wall of the housing, a first inlet port having a first opening at the valve chamber and a second inlet port having a second opening at the valve chamber, a first fluid flowing into the first inlet port, a second fluid flowing into the second inlet port, the rotor includes, in a second peripheral wall of the rotor, a first inflow pipe communicating with the first opening and a second inflow pipe communicating with the second opening, and opens a mixing flow path at one end of the rotor in an axial direction, the mixing flow path communicates with the first inflow pipe and the second inflow pipe, the first fluid flowing into the first inflow pipe and/or the second fluid flowing into the second inflow pipe flowing into the mixing flow path as a mixed fluid, and the housing includes, in the first peripheral wall, a discharge port that discharges the first fluid and/or second fluid flowing into the valve chamber without passing through the first inflow pipe and/or the second inflow pipe of the rotor, respectively, as a discharge fluid to the outside of the housing, and includes an outlet port communicating with the mixing flow path.

According to the present invention, it is possible to provide a mixing valve capable of minimizing influences on devices disposed on an upstream side by not hindering a flow of a fluid on the upstream side.

DETAILED DESCRIPTION OF THE INVENTION

Figures 1, 2:
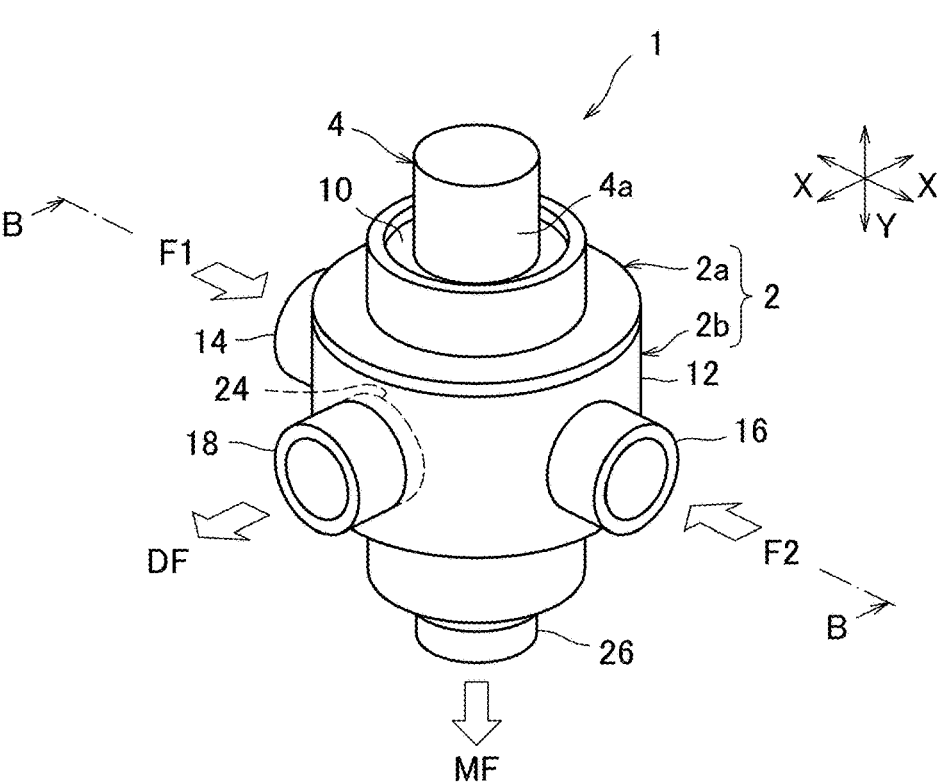
FIG. 1 is a perspective view of a mixing valve according to an embodiment of the present invention.
FIG. 2 is a vertical sectional view of the mixing valve in FIG. 1.

FIG. 1 illustrates a perspective view of a mixing valve 1 according to an embodiment of the present invention, and FIG. 2 illustrates a vertical sectional view of the mixing valve 1 in FIG. 1. The mixing valve 1 includes a cylindrical housing 2 that is a valve main body and a rotor 4 that is a valve body. A valve chamber 6 is formed inside the housing 2, and the rotor 4 is rotatably inserted into the valve chamber 6. Specifically, the rotor 4 includes an upper drive shaft 4a and a lower mixing pipe 4b. The drive shaft 4a is driven and rotated by an actuator such as a stepping motor, which is not illustrated. A mixing flow path 24, which will be described later, is formed in the mixing pipe 4b.

The housing 2 is formed by welding an upper lid 5 member 2a and a lower tubular member 2b, for example. The drive shaft 4a and the mixing pipe 4b of the rotor 4 are rotatably supported by each of inner circumferential surfaces of the lid member 2a and the tubular member 2b of the housing 2 via a shaft seal device 10. The shaft seal device 10 is configured of a sealing member such as an O ring and a shaft bearing such as a bearing, and the valve chamber 6 is sealed and sectioned inside the housing 2 by each shaft seal device 10.

The first peripheral wall 12 formed in the tubular member 2b is provided with a first inlet port 14, a second inlet port 16, and a discharge port 18. In the present embodiment, all of the first inlet port 14, the discharge port 18, and the second inlet port 16 are provided to project in a radial direction X of the housing 2 from the first peripheral wall 12 at positions at substantially angles of 90 degrees in the counterclockwise circumferential direction of the first peripheral wall 12 when seen in FIG. 1 in this order. Also, an outlet port 26 is provided to project in an axial direction Y (the same direction as an axial direction Y of the rotor 4) of the housing 2 along the axial direction Y of the rotor 4.

Specifically, the first inlet port 14, the second inlet port 16, and the discharge port 18 are provided to project in the radial direction X of the housing 2 from the first peripheral wall 12 on the same radial-direction X plane of the housing 2. The first inlet port 14 has a first opening 20 at the valve chamber 6, and a first fluid F1 flows into the first inlet port 14. The second inlet port 16 has a second opening 22 at the valve chamber 6, and a second fluid F2 flows int the second inlet port 16.

The mixing flow path 24 through which the first fluid F1 and/or the second fluid F2 flows as a mixed fluid MF is formed in the mixing pipe 4b of the rotor 4, and the mixing flow path 24 opens at a lower end of the mixing pipe 4b, in other words, one end (lower end) of the rotor 4 in the axial direction Y. Also, the lower end of the tubular member 2b of the housing 2 has a reduced diameter, and the outlet port 26 connected to the mixing pipe 4b is formed in the first peripheral wall 12 at the location of the reduced diameter while opening downward. The lower end of the mixing pipe 4b is positioned at the outlet port 26.

Note that the mixing flow path 24 opening at one end of the rotor 4 in the axial direction Y communicates with the outlet port 26 of the housing 2. Also, in the present embodiment, the outlet port 26 is provided to project in the axial direction Y of the housing 2 along the axial direction Y of the rotor 4. The second peripheral wall 28 formed in the mixing pipe 4b of the rotor 4 is provided with a first inflow pipe 30 and a second inflow pipe 32.

Figure 3:
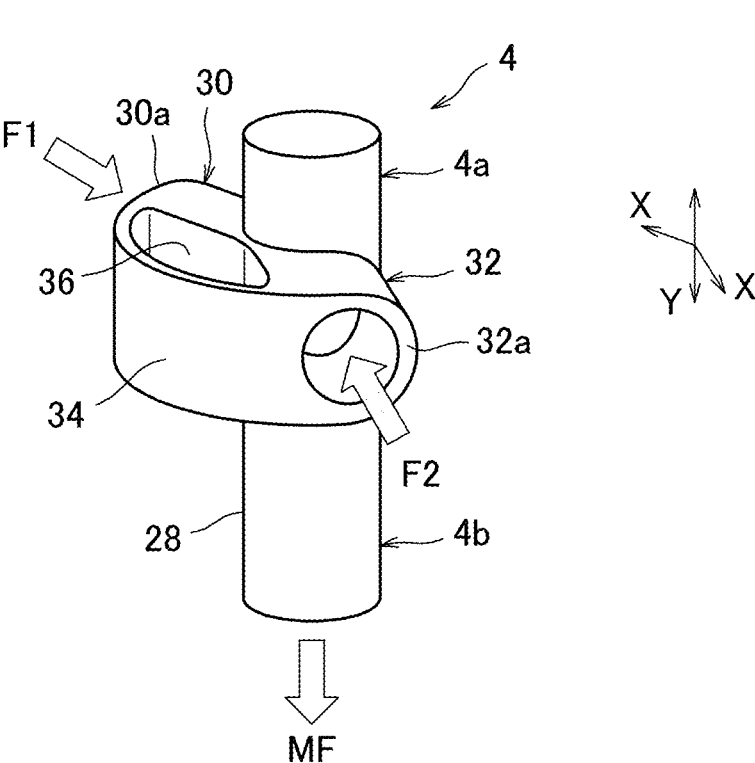
FIG. 3 is a perspective view of a rotor seen in a direction A in FIG. 2.

FIG. 3 illustrates a perspective view of the rotor 4 seen in a direction A in FIG. 2. In the rotor 4, both the first inflow pipe 30 and the second inflow pipe 32 are provided to project in the radial direction X (the same direction as the radial direction X of the housing 2) of the mixing pipe 4b from the second peripheral wall 28 at positions of obtuse angles of less than 180 degrees in the counterclockwise circumferential direction of the mixing pipe 4b when seen in FIG. 3. Specifically, the first inflow pipe 30 and the second inflow pipe 32 are provided to project in the radial direction X of the mixing pipe 4b from the second peripheral wall 28 in the same radial-direction X plane of the mixing pipe 4b. Moreover, an opening end 30a of the first inflow pipe 30 and an opening end 32a of the second inflow pipe 32 are connected by an arc plate-shaped connecting portion 34, and a hollow 36 is formed between the connecting portion 34 and the second peripheral wall 28.

Figure 4:
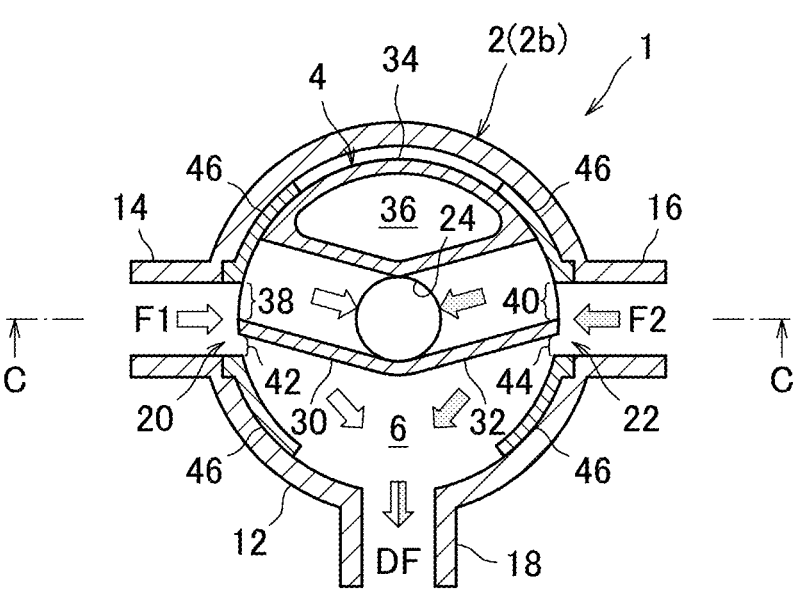
FIG. 4 is a horizontal sectional view of the mixing valve in FIG. 1 in a direction B-B.

FIG. 4 illustrates a horizontal sectional view of the mixing valve 1 in FIG. 1 in a direction B-B. The first inflow pipe 30 communicates with the mixing flow path 24, and a first communication region 38 in the first inflow pipe 30 communicating with the first opening 20 changes with rotation of the rotor 4. Also, the second inflow pipe 32 communicates with the mixing flow path 24, and a second communication region 40 in the second inflow pipe 32 communicating with the second opening 22 changes with rotation of the rotor 4.

Here, in the present embodiment a non-communication region 42 may be formed in the first opening 20 in accordance with rotation of the rotor 4. The non-communication region 42 is an opening region in the first opening 20 communicating with the valve chamber 6 and does not communicate with the first inflow pipe 30. On the other hand, a second non-communication region 44 may be formed in the second opening 22 in accordance with rotation of the rotor 4. The second non-communication region 44 is an opening region in the second opening 22 communicating with the valve chamber 6 and does not communicate with the second inflow pipe 32.

The first fluid F1 and/or the second fluid F2 flowing into the valve chamber 6 through the first non-communication region 42 and/or the second non-communication region 44 are discharged as a discharge fluid DF to the outside of the housing 2 via the discharge port 18. In other words, the first fluid F1 that has flowed in from the first opening 20 and has not passed through the first inflow pipe 30 flows into the valve chamber 6, the second fluid F2 that has flowed into the second opening 22 and has not passed through the second inflow pipe 32 flows into the valve chamber 6, and the first fluid F1 and the second fluid F2 are mixed in the valve chamber 6 and are discharged as a discharge fluid DF to the outside of the housing 2 via the discharge port 18.

The discharge fluid DF is appropriately used in a temperature adjustment system 48, which will be described later, or the like. Note that as illustrated in FIG. 4, sealing members 46 that smoothly bring the first inflow pipe 30 and the second inflow pipe 32 into sliding contact and tightly seal the valve chamber 6 with rotation of the rotor 4 are attached to inner circumferential surfaces in the vicinity of the first opening 20 and the second opening 22 of the tubular member 2b of the housing 2, respectively.

Figure 5:
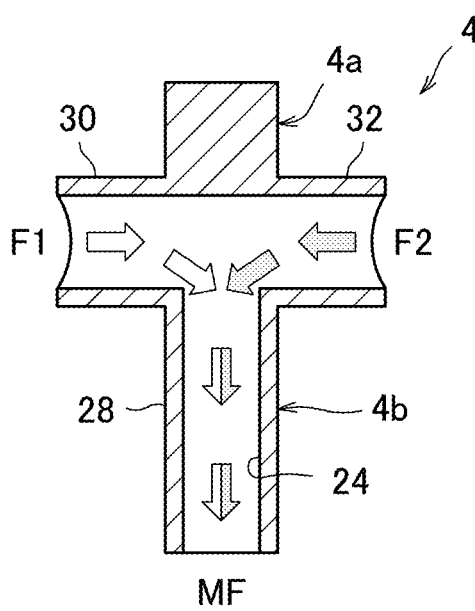
FIG. 5 is a vertical sectional view of the rotor in FIG. 4 in a direction C-C.

FIG. 5 illustrates a vertical sectional view of the rotor 4 in FIG. 4 in a direction C-C. The first fluid F1 flowing through the first communication region 38 communicating with the first inflow pipe 30 at the first opening 20 passes through the first inflow pipe 30 and flows into the mixing flow path 24 formed in the mixing pipe 4b of the rotor 4. The second fluid F2 flowing through the second communication region 40 communicating with the second inflow pipe 32 at the second opening 22 passes through the second inflow pipe 32 and flows into the mixing flow path 24 formed in the mixing pipe 4b of the rotor 4.

The first fluid F1 passing through the first inflow pipe 30 and the second fluid F2 passing through the second inflow pipe 32 are mixed in the mixing flow path 24 and are caused to flow out as the mixed fluid MF from the outlet port 26. The mixed fluid MF is appropriately used in the temperature adjustment system 48, which will be described later, or the like. Note that in the case illustrated in FIGS. 4 and 5, the ratio of the first communication region 38 occupying the area of the first opening 20, in other words, the opening degree of the first inflow pipe 30 is 50%, the ratio of the second communication region 40 occupying the area of the second opening 22, in other words, the opening degree of the second inflow pipe 32 is 50%, and the rotation position of the rotor 4 in this case will be referred to as R2.

Figure 6:
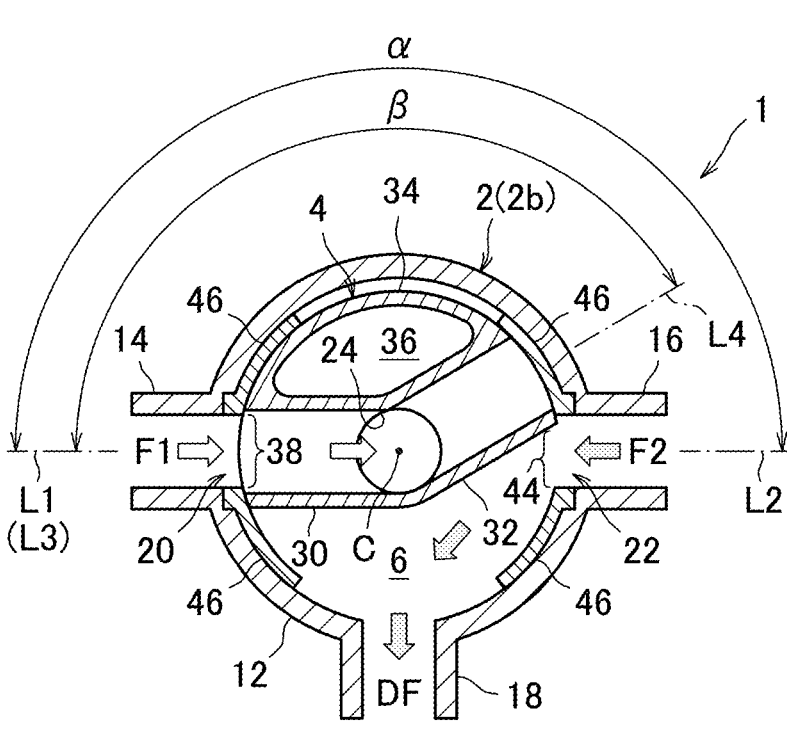
FIG. 6 is a horizontal sectional view of the mixing valve in a case where a first communication region is an entire region of a first opening.
Figure 7:
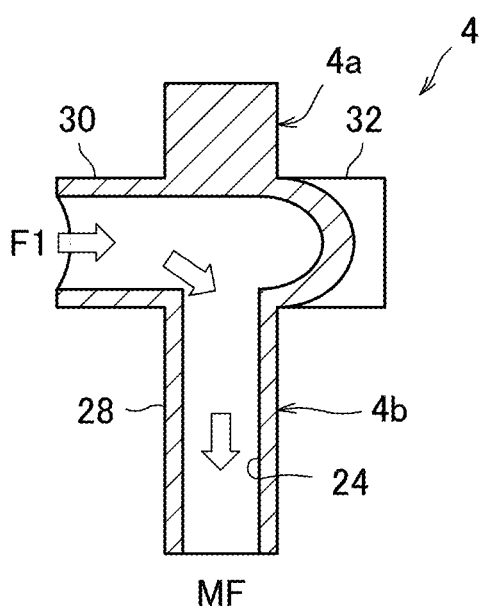
FIG. 7 is a vertical sectional view of the rotor in the case of FIG. 6.

FIG. 6 illustrates a horizontal sectional view of the mixing valve 1 in a case where the first communication region 38 is the entire region of the first opening 20, and FIG. 7 illustrates a vertical sectional view of the rotor 4 in the case of FIG. 6. In the case illustrated in FIGS. 6 and 7, the opening degree of the first inflow pipe 30 is 100%, the opening degree of the second inflow pipe 32 is 0%, and only the first fluid F1 flowing through the first communication region 38 in the first inflow pipe 30 flows through the mixing flow path 24 and flows out from the outlet port 26. On the other hand, the second fluid F2 passing through the second non-communication region 44 flows through the space in the valve chamber 6 and is discharged as the discharge fluid DF from the discharge port 18. Note that the rotation position of the rotor 4 in this case will be referred to as R1.

Figures 8, 9:
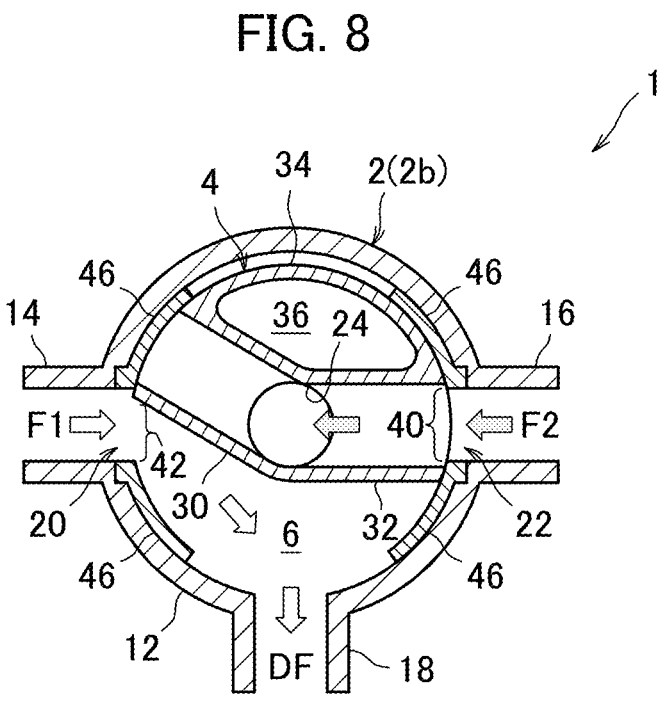
FIG. 8 is a horizontal sectional view of the mixing valve in a case where a second communication region is an entire region of a second opening.
FIG. 9 is a vertical sectional view of the rotor in the case of FIG. 8.

FIG. 8 illustrates a horizontal sectional view of the mixing valve 1 in a case where the second communication region 40 is the entire region of the second opening 22, and FIG. 9 illustrates a vertical sectional view of the rotor 4 in the case of FIG. 8. In the case illustrated in FIGS. 8 and 9, the opening degree of the first inflow pipe 30 is 0%, the opening degree of the second inflow pipe 32 is 100%, and only the second fluid F2 flowing through the second communication region 40 in the second inflow pipe 32 flows through the mixing flow path 24 and flows out from the outlet port 26. On the other hand, the first fluid F1 passing through the first non-communication region 42 flows through the space in the valve chamber 6 and is discharged as the discharge fluid DF from the discharge port 18. Note that the rotation position of the rotor 4 in this case will be referred to as R3.

Figure 10:
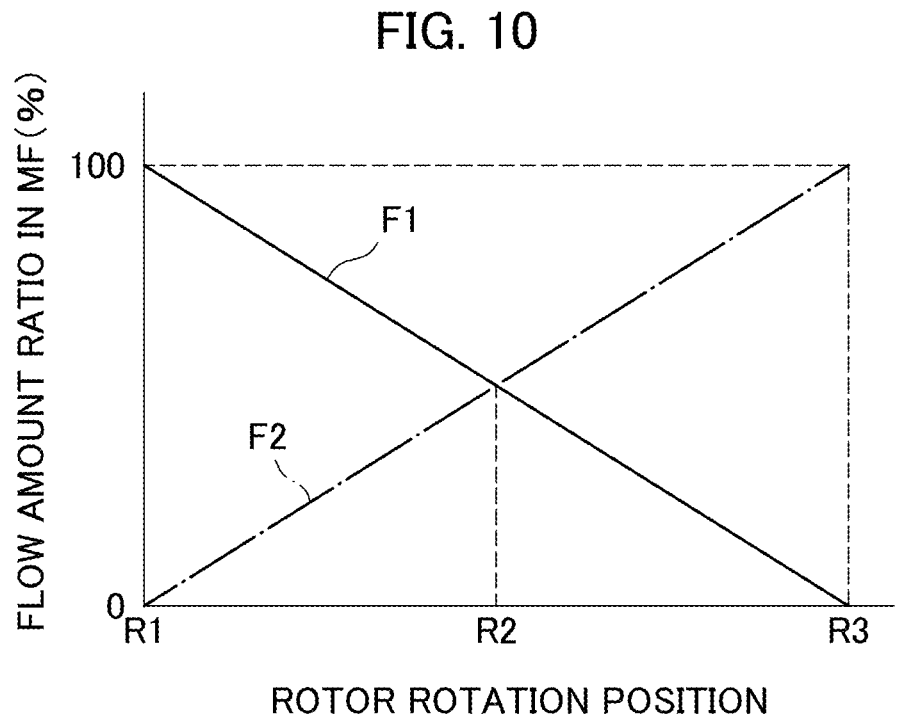
FIG. 10 is a graph representing a flow amount ratio of a first fluid and a second fluid in a mixed fluid in accordance with a rotation position of the rotor.
Figure 11:
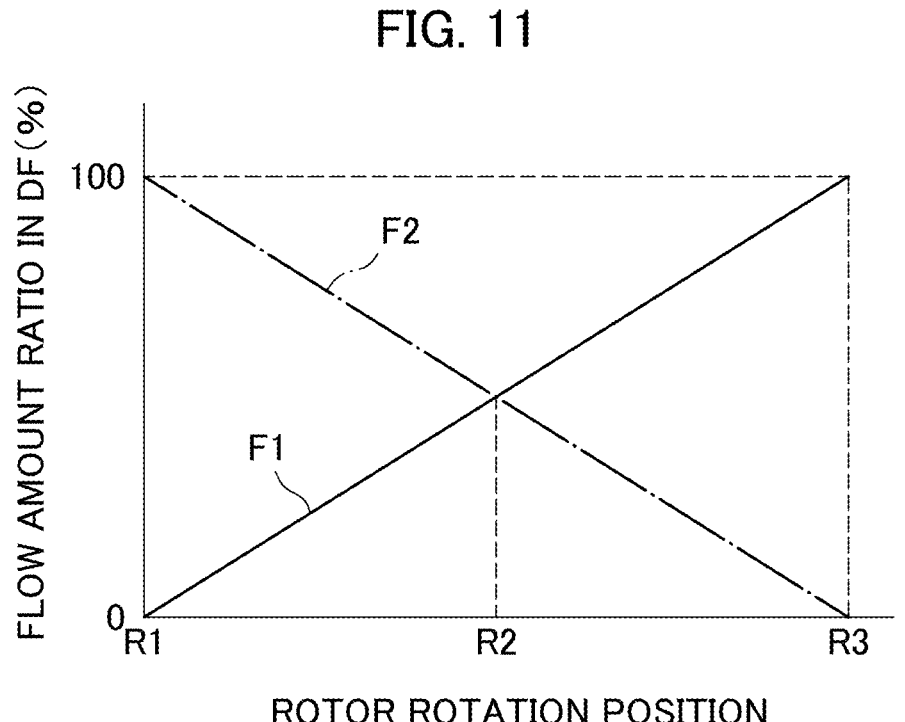
FIG. 11 is a graph representing a flow amount ratio of the first fluid and the second fluid in a discharged fluid in accordance with the rotation position of the rotor.

FIG. 10 illustrates a graph representing a flow amount ratio between the first fluid F1 and the second fluid F2 in the mixed fluid MF in accordance with the rotation position of the rotor 4, and FIG. 11 illustrates a graph representing a flow amount ratio between the first fluid F1 and the second fluid F2 in the discharge fluid DF in accordance with the rotation position of the rotor 4. At the rotation position R1, the mixed fluid MF includes 100% of the first fluid F1 as illustrated in FIGS. 6 and 7 as well. In this case, the second opening 22 of the second inlet port 16 is completely blocked by the rotor 4, and the second fluid F2 is dammed up in the related art.

Therefore, the flow of the second fluid F2 on the upstream side of the second inlet port 16 completely stagnates in the related art. However, in the present embodiment, the discharge fluid DF including 100% of the second fluid F2 is caused to flow through the valve chamber 6 and is then discharged from the discharge port 18 at the rotation position R1. In this manner, flows of both the first fluid F1 and the second fluid F2 on the upstream side of the mixing valve 1 are not hindered.

On the other hand, the mixed fluid MF includes 50% each of the first fluid F1 the second fluid F2 as illustrated in FIGS. 4 and 5 at the rotation position R2. Therefore, each of the flow of the first fluid F1 on the upstream side of the first inlet port 14 and the flow of the second fluid F2 on the upstream side of the second inlet port 16 stagnates by about ½ in the related art. However, in the present embodiment, the discharge fluid DF including 50% each of the first fluid F1 and the second fluid F2 is caused to flow through the valve chamber 6 and is then discharged from the discharge port 18 at the rotation position R2. In this manner, flows of both the first fluid F1 and the second fluid F2 on the upstream side of the mixing valve 1 are not hindered.

On the other hand, the mixed fluid MF includes 100% of the second fluid F2 as illustrated in FIGS. 8 and 9 as well at the rotation position R3. Therefore, the flow of the first fluid F1 on the upstream side of the first inlet port 14 completely stagnates in the related art. However, in the present embodiment, the discharge fluid DF including 100% of the first fluid F1 is caused to flow through the valve chamber 6 and is discharged from the discharge port 18 at the rotation position R3.

In this manner, flows of both the first fluid F1 and the second fluid F2 on the upstream side of the mixing valve 1 are not hindered. In this manner, the flows of both the first fluid F1 and the second fluid F2 on the upstream side of the mixing valve 1 are not hindered regardless of the rotation position of the rotor 4, and it is thus possible to minimize influences on devices disposed on the upstream side of the mixing valve 1.

Furthermore, an intersection angle on a side of a region where the discharge port 18 is not provided in a case where a first line L1 connecting a rotation center C of the rotor 4 to a center of the first opening 20 in the radial direction and a second line L2 connecting the rotation center C to a center of the second opening 22 in the radial direction are defined on the same radial-direction X plane of the housing 2 is defined as a fluid inflow angle α as illustrated in FIG. 6. Also, an intersection angle on the side of the region where the discharge port 18 is not provided in a case where a third line L3 (the same as the first line L1 in FIG. 6) connecting the rotation center C to a center of the opening of the first inflow pipe 30 in the radial direction and a fourth line L4 connecting the rotation center C to a center of the opening of the second inflow pipe 32 in the radial direction are defined on the same radial-direction plane of the housing 2 is defined as a fluid mixing angle β.

At this time, the fluid mixing angle β and the fluid inflow angle α are set to different angles, and preferably, the fluid mixing angle β is smaller than the fluid inflow angle α. In the present embodiment, the fluid inflow angle β is an obtuse angle of less than 180 degrees (about 120 degrees), while the fluid inflow angle α is substantially 180 degrees. It is possible to secure a broader region between the first inlet port 14 and the second inlet port 16 than the rotation region of the rotor 4 around the rotation center C at the center by such a relationship between the fluid inflow angle α and the fluid mixing angle β being satisfied in the mixing valve 1. Therefore, it is possible to form the first non-communication region 42 and/or the second non-communication region 44, to cause the first fluid F1 and/or the second fluid F2 to flow into the valve chamber 6, and to discharge the fluids as the discharge fluid DF from the discharge port 18.

Figure 12:
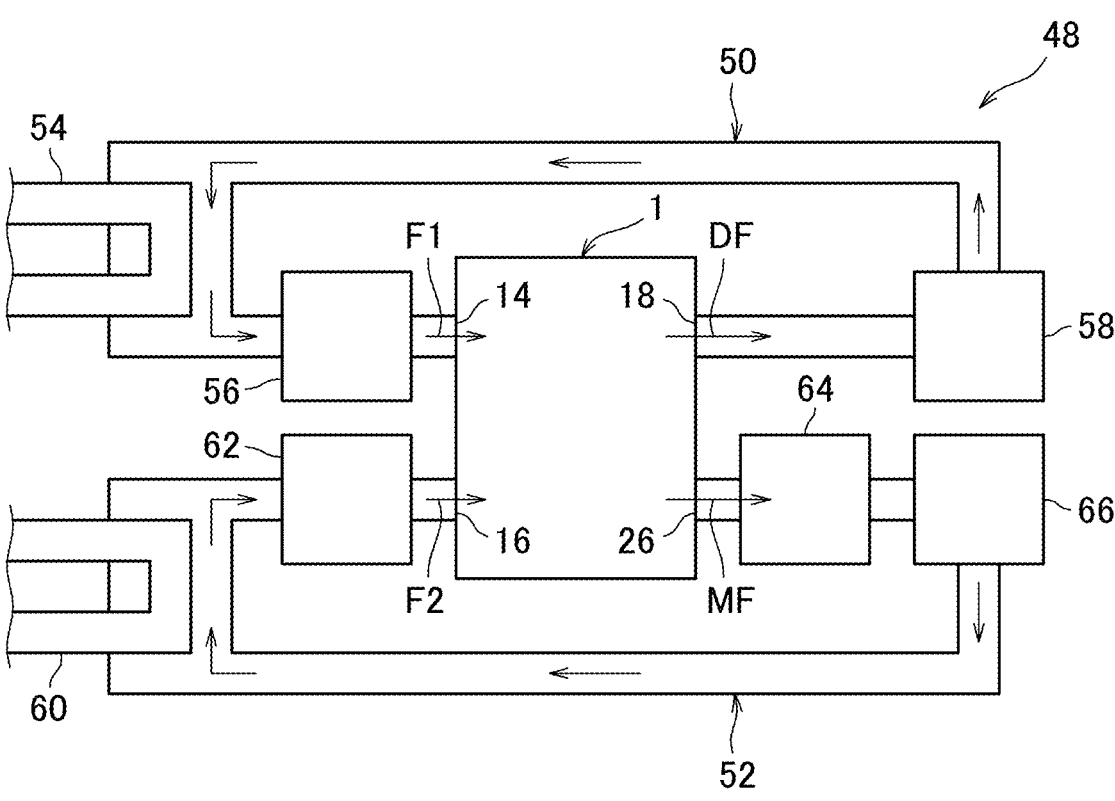
FIG. 12 is a configuration diagram of a temperature adjustment system in which the mixing valve is installed.

FIG. 12 is a configuration diagram of the temperature adjustment system 48 in which the mixing valve 1 is installed. The temperature adjustment system 48 is mounted in a vehicle such as an electric vehicle or a hybrid vehicle, for example, and includes a radiator cooling water circuit 50 and a battery cooling water circuit 52. A heat exchange unit 54 for a heat exchanger for cooling, an electric pump 56, the mixing valve 1, and a radiator 58 are inserted into the radiator cooling water circuit 50 in this order in a direction of a water flow.

In the radiator cooling water circuit 50, cooling water cooled by the heat exchange unit 54 is sent by the electric pump 56 and flows into the first inlet port 14 of the mixing valve 1 as the first fluid F1. Thereafter, cooling water as the discharge fluid DF is fed to the radiator 58 from the discharge port 18, and the cooling water is used for heat dissipation of devices mounted in the vehicle.

On the other hand, a heat exchange unit 60 for a heat exchanger for heating, an electric pump 62, the mixing valve 1, a battery 64, and an electric power train 66 are inserted into the battery cooling water circuit 52 in this order in a direction of a water flow. In the battery cooling water circuit 52, warm water heated by the heat exchange unit 60 is sent by the electric pump 62 and flows into the second inlet port 16 of the mixing valve 1 as the second fluid F2. Thereafter, warm water as the mixed fluid MF is fed to the battery 64 from the outlet port 26, and the battery 64 exposed to a low-temperature environment is heated with the warm water.

The water after heating the battery 64 is fed to the electric power train 66 and is used for heat dissipation of an inverter, a motor, and the like configuring the electric power train 66. The temperature adjustment system 48 can also cool the battery 64 in a high-temperature environment or in a long-time traveling of the vehicle by changing the flow amount ratio between the first fluid F1 (cooling water) and the second fluid F2 (warm water) in the mixed fluid MF through rotation of the rotor 4.

Also, flows of both the first fluid F1 and the second fluid F2 on the upstream side of the mixing valve 1 are not hindered regardless of the rotation position of the rotor 4 as described above. Therefore, since the flows of the first fluid F1 and the second fluid F2 do not stagnate on the upstream side, which is the upstream side of the mixing valve 1, it is possible to prevent degradation of heat exchange efficiency in the heat exchange units 54 and 60 disposed on the upstream side of the mixing valve 1.

As described above, the first non-communication region 42 may be formed in the first opening 20 of the first inlet port 14, and the first non-communication region 42 communicates with the valve chamber 6 in accordance with rotation of the rotor 4 but does not communicate with the first inflow pipe 30 in the mixing valve 1 according to the present embodiment. Also, the second non-communication region 44 may be formed in the second opening 22 of the second inlet port 16, and the second non-communication region 44 communicates with the valve chamber 6 in accordance with rotation of the rotor 4 but does not communicate with the second inflow pipe 32.

The first fluid F1 and/or the second fluid F2 that has flowed into the valve chamber 6 through the first non-communication region 42 and/or the second non-communication region 44, respectively, is discharged as the discharge fluid DF to the outside of the housing 2 via the discharge port 18. In this manner, the flows of both the first fluid F1 and the second fluid F2 on the upstream side of the mixing valve 1 are not hindered regardless of the rotation position of the rotor 4. Therefore, it is possible to minimize influences on devices disposed on the upstream side of the mixing valve 1, and specifically, to prevent degradation of heat exchange efficiency in the heat exchange units 54 and 60 as described above.

Also, the first peripheral wall 12 of the housing 2 is provided with the discharge port 18 from which the discharge fluid DF is discharged, in addition to the first inlet port 14 into which the first fluid F1 flows and the second inlet port 16 into which the second fluid F2 flows. Since each of the ports 14, 16, and 18 is disposed in the circumferential direction of the first peripheral wall 12 of the housing 2 in this manner, it becomes easy to handle a hose or the like to be connected to each of the ports 14, 16, and 18, and it is possible to improve workability when the mixing valve 1 is installed. Also, it is possible to keep the hose or the like to be connected to each of the ports 14, 16, and 18 compact in the circumferential direction of the first peripheral wall 12 and to thereby save the space around the mixing valve 1.

Moreover, the first inlet port 14, the second inlet port 16, and the discharge port 18 are provided to project in the radial direction X of the housing 2 from the first peripheral wall 12 on the same radial-direction X plane of the housing 2. It is thus possible to further effectively promote an improvement in workability when the mixing valve 1 is installed and space saving around the mixing valve 1 described above. Furthermore, it is possible to reduce the dimension of the mixing valve 1 in the height direction merely by a simple change of shortening the length of the mixing pipe 4b and the height of the tubular member 2b and to thereby easily realize formation of the mixing valve 1 in a compact size.

Also, when the aforementioned fluid inflow angle α and fluid mixing angle β are defined, the fluid mixing angle β is smaller than the fluid inflow angle α. It is thus possible to secure a broader region between the first inlet port 14 and the second inlet port 16 than the rotation region of the rotor 4 around the rotation center C at the center. Therefore, it is possible to form the first non-communication region 42 and/or the second non-communication region 44, to cause the first fluid F1 and/or the second fluid F2 to flow into the valve chamber 6, and to discharge the first fluid F1 and/or the second fluid F2 as the discharge fluid DF from the discharge port 18.

Therefore, it is possible to realize the mixing valve 1 that does not hinder the flow of the fluid on the upstream side and can minimize influences on devices disposed on the upstream side merely by adjustment of setting the positions of the first inlet port 14 and the second inlet port 16 in the housing 2 and the positions of the first inflow pipe 30 and the second inflow pipe 32 in the rotor 4 such that the fluid mixing angle β is smaller than the fluid inflow angle α.

Figure 13:
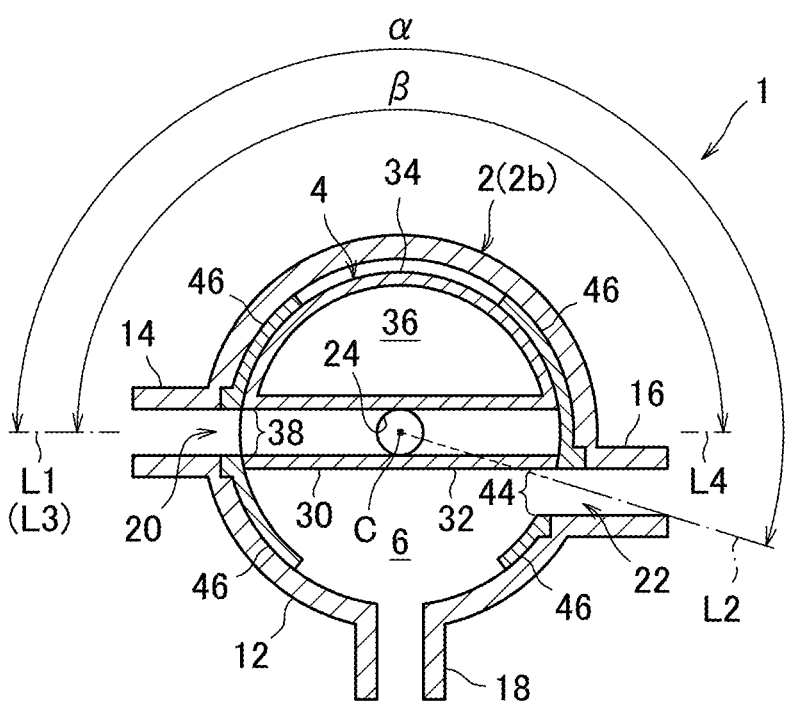
FIG. 13 is a horizontal sectional view of a mixing valve according to a modification.

Although the embodiment of the present invention has been described hitherto, the present invention is not limited thereto, and various modifications can be made without departing from the gist of the present invention. For example, the rotor 4 with a fluid mixing angle β of substantially 180 degrees may be employed as illustrated in FIG. 13, and in this case, it is only necessary to provide the second inlet port 16 to project at a position at an angle that is substantially larger than 180 degrees in the clockwise circumferential direction of the first peripheral wall 12 from the first inlet port 14.

In this manner, the fluid inflow angle α is larger than 180 degrees, and the fluid mixing angle β is thus smaller than the fluid inflow angle α. Therefore, since the aforementioned relationship between the fluid inflow angle α and the fluid mixing angle β is established in this case as well, it is possible to realize the mixing valve 1 that does not hinder the flow of the fluid on the upstream side. Also, the first inlet port 14, the second inlet port 16, and the discharge port 18 may not be provided to project in the radial direction X of the housing 2 from the first peripheral wall 12 like the second inlet port 16 illustrated in FIG. 13.

Also, the mixing valve 1 according to the present embodiment can be used not only to mix cooling water and warm water in the aforementioned temperature adjustment system 48 but also to mix various fluids that are not limited to liquids but also include gas in systems for various kinds of adjustment that is not limited to temperature adjustment.

REFERENCE SIGNS LIST 1 mixing valve
2 housing 4 rotor
6 valve chamber
12 first peripheral wall
14 first inlet port
16 second inlet port
18 discharge port
20 first opening
22 second opening
24 mixing flow path
26 outlet port
28 second peripheral wall
30 first inflow pipe
32 second inflow pipe
38 first communication region
40 second communication region
42 first non-communication region
44 second non-communication region
C rotation center
F1 first fluid
F2 second fluid
MF mixed fluid
DF discharge fluid
L1 first line
L2 second line
L3 third line
L4 fourth line
α fluid inflow angle
β fluid mixing angle
X radial direction
Y axial direction

What is claimed is:

1. A mixing valve comprising:

a cylindrical housing with a valve chamber formed therein; and a rotor rotatably inserted into the valve chamber, wherein the cylindrical housing includes, in a first peripheral wall of the cylindrical housing, a first inlet port having a first opening at the valve chamber and a second inlet port having a second opening at the valve chamber, a first fluid configured to flow into the first inlet port, a second fluid configured to flow into the second inlet port, the rotor includes, in a second peripheral wall of the rotor, a first inflow pipe communicating with the first opening and a second inflow pipe communicating with the second opening, and opens a mixing flow path at one end of the rotor in an axial direction, the mixing flow path communicates with the first inflow pipe and the second inflow pipe, such that the first fluid is configured to flow into the first inflow pipe and/or the second fluid is configured to flow into the second inflow pipe flowing into the mixing flow path as a mixed fluid, and the cylindrical housing includes, in the first peripheral wall, a discharge port configured to discharge the first fluid and/or the second fluid flowing into the valve chamber without passing through the first inflow pipe and/or the second inflow pipe of the rotor, respectively, as a discharge fluid to outside of the cylindrical housing, and includes an outlet port communicating with the mixing flow path.

2. The mixing valve according to claim 1, wherein a first non-communication region that does not communicate with the first inflow pipe but communicates with the valve chamber is formed in response to rotation of the rotor in the first opening of the cylindrical housing.

3. The mixing valve according to claim 2, wherein a second non-communication region that does not communicate with the second inflow pipe but communicates with the valve chamber is formed in response to rotation of the rotor in the second opening of the cylindrical housing.

4. The mixing valve according to claim 1, wherein the first inlet port, the second inlet port, and the discharge port are provided to project in a radial direction of the cylindrical housing from the first peripheral wall on a same radial-direction plane of the cylindrical housing.

5. The mixing valve according to claim 1, wherein when an intersection angle between a first line connecting a rotation center of the rotor to a center of the first opening in a radial direction of the cylindrical housing and a second line connecting the rotation center to a center of the second opening in the radial direction is defined as a fluid inflow angle, and an intersection angle between a third line connecting the rotation center to a center of an opening of the first inflow pipe in the radial direction and a fourth line connecting the rotation center to a center of an opening of the second inflow pipe in the radial direction on same radial-direction plane is defined as a fluid mixing angle, the fluid mixing angle and the fluid inflow angle are different from each other.

6. The mixing valve according to claim 5, wherein the fluid mixing angle is smaller than the fluid inflow angle.

* * * * *